(12) United States Patent
Pourshahid et al.

(10) Patent No.: US 11,182,680 B2
(45) Date of Patent: Nov. 23, 2021

(54) USING ONTOLOGY FOR CAUSE-EFFECT ANALYSIS

(71) Applicant: International Business Machines Corporation, Armonk, NY (US)

(72) Inventors: Alireza Pourshahid, Ottowa (CA); Vinay N. Wadhwa, Ottowa (CA); Graham A. Watts, Ottawa (CA); Qing Wei, Manotick (CA)

(73) Assignee: International Business Machines Corporation, Armonk, NY (US)

( * ) Notice: Subject to any disclaimer, the term of this patent is extended or adjusted under 35 U.S.C. 154(b) by 1553 days.

(21) Appl. No.: 14/940,196

(22) Filed: Nov. 13, 2015

(65) Prior Publication Data

US 2017/0140288 A1 May 18, 2017

(51) Int. Cl.
G06N 5/02 (2006.01)
(52) U.S. Cl.
CPC .................... G06N 5/022 (2013.01)
(58) Field of Classification Search
CPC .................................................. G06N 5/022
See application file for complete search history.

(56) References Cited

U.S. PATENT DOCUMENTS

| 8,489,530 | B2 | 7/2013 | De et al. |
| 2010/0325206 | A1 | 12/2010 | Dayal et al. |
| 2012/0221583 | A1* | 8/2012 | Kulack ............... G06F 16/2291 707/755 |
| 2015/0120357 | A1* | 4/2015 | Tuchman ....... G06Q 10/063114 705/7.15 |
| 2017/0220937 | A1* | 8/2017 | Wada ..................... G06N 5/025 |

OTHER PUBLICATIONS

Lagnado, David A., and Steven Sloman. "Learning causal structure." Proceedings of the Annual Meeting of the Cognitive Science Society. vol. 24. No. 24. 2002. (Year: 2002).*
Zhang, Shichao, and Chengqi Zhang. "Discovering causality in large databases." Applied Artificial Intelligence 16.5 (2002): 333-358. (Year: 2002).*
Morteza Dehghan et al, Causal Explanation and Fact Mutability in Counterfactual Reasoning, homepages. uconn.edu; Feb. 2012. Entire Article.
Joris M. Mooij et al, Distinguishing cause from effect using observational data: methods and Benhmarks, Ariv:1412.3773v2 [cs.LG] Jul. 31, 2015, Entire Article.
Wikipedia, The Free Encyclopedia, Granger causality, https://en.wikipedia.org/wiki/Granger_causality; Sep. 19, 2015; Entire Article.
Wikipedia, The Free Encyclopedia, Rubin causal model; https://en.wikipedia.org/wiki/Rubin_causal_model; Sep. 19, 2015, Entire Article.

* cited by examiner

Primary Examiner — Kevin W Figueroa
(74) Attorney, Agent, or Firm — Michael A. Petrocelli

(57) ABSTRACT

A method, a computer program product, and an information handling system is provided for identifying a causal relationship between metrics performing steps. The steps include receiving a correlation significance Sij between a metric Mi and a metric Mj; receiving a mutability attribute Ai for the Mi and a mutability attribute Aj for the metric Mj from a data source; and identifying the metric Mi causing the metric Mj with the Sij if only if the Ai is immutable and the Aj is mutable.

20 Claims, 3 Drawing Sheets

310

| Year | Model | Quality | Impurities |
|---|---|---|---|
| 2010 | A | 0.98 | 0.1 |
| 2010 | B | 0.97 | 0.2 |
| 2010 | C | 0.97 | 0.15 |
| 2010 | D | 0.9 | 0.3 |
| 2011 | A | 0.96 | 0.2 |
| 2011 | B | 0.96 | 0.1 |
| 2011 | C | 0.99 | 0.15 |
| 2011 | D | 0.93 | 0.3 |
| 2012 | A | 0.98 | 0.1 |
| 2012 | B | 0.96 | 0.15 |
| 2012 | C | 0.96 | 0.2 |
| 2012 | D | 0.94 | 0.25 | example of metric structured data 220 with descriptive fields

320 cYear
CproductModel
cQuality
    CProductQuality
    CRawMaterialQuality

Note that CProductQuality and CRawMaterialQuality are grouped together under a parent cQuality

330

| Column | Concept |
|---|---|
| Year | cYear |
| Model | cProductModel |
| Quality | cProductQuality |
| Impurities | cRawMaterialQuality | structured metrics with descriptive fields mapped to concepts

340

Quality (mutable) – Impurities (immutable) = -0.7
Year (immutable) – Quality (mutable) = 0.3
Model (immutable) – Impurities (immutable) = 0.2

Figure 3

USING ONTOLOGY FOR CAUSE-EFFECT ANALYSIS

BACKGROUND

The present invention relates to a computing environment, and more specifically to a computer program, method, and system for providing evidence of a cause and effect relationship.

SUMMARY

According to one embodiment of the invention, there is provided a method identifying a causal relationship between metrics, the method implemented by a processor and performing steps. The steps include receiving a correlation significance Sij between a metric Mi and a metric Mj; receiving a mutability attribute Ai for the metric Mi and a mutability attribute Aj for the metric Mj from a data source; determining if the attribute Ai is immutable and the attribute Aj is mutable to form a causal assessment of true or false of a causal relationship; and performing an action based on the causal assessment.

According to one embodiment of the invention, there is provided a computing program product executing instructions having the steps of the method identifying a causal relationship between metrics.

According to one embodiment of the invention, there is provided an information handling system including at least one processor executing instructions implementing steps of the method identifying a causal relationship between metrics.

BRIEF DESCRIPTION OF THE DRAWINGS

The above-mentioned features of the present invention may be better understood, and its numerous objects, features, and advantages made apparent to those skilled in the art by taken in conjunction with the accompanying drawings wherein like reference numerals denote like elements and in which:

FIG. 3 depicts example data illustrating n example embodiment of the invention herein.

DETAILED DESCRIPTION

Embodiments of the invention are described below with reference to drawings in detail.

Often, metrics are captured from processes. The metrics represent information about the processes. In many systems the information is tabulated in a structured form, such as, a table. There are various ways of representing the information, such as, visualizations. Standard techniques for displaying the information include graphical representations such as charts, flows, statistical graphs and the like. Statistical analysis of the tabulated data are effective at finding correlations between the metrics. However, correlation alone do not necessarily imply a cause-effect relationship which can be used for prediction.

There are various methods used to perform a causal analysis, such experimental design, t-test, Granger causality test, Rubin causal model, and so on. These statistical analysis are usually performed using controlled trials rather than observational data alone. Variable may be identified as correlated by other means including factor analysis, path analysis, structural equation modeling, and related multivariate statistical methods. However, correlated variables may not be causal as other factors may influence the observed relationship. Many approaches are based on a maximum likelihood or generalized least squares estimation developed for covariance structure models (CSMs). Large-sample theory provides a chi-square goodness-of-fit test for comparing a first model against a general alternative. However, none of the existing mechanisms provide evidence of a cause-effect (hereafter called "causal relationship" or "identifying Mi causes Mj" or "changes to Mi cause changes to Mj") using ontology in combination with a mathematical or statistical analysis.

In view of the deficiencies in prior art, various method, system, and computer program product embodiments of the invention are provided herein. This invention takes advantage of a domain specific data base containing a mutable or immutable attribute associate with each metric specific to the domain. For a given domain, a metric has a mutable attribute if the attribute can be changed for the process under study. A metric has an immutable attribute if the attribute is not subject to change or is a given for the process under study.

Figure 1:
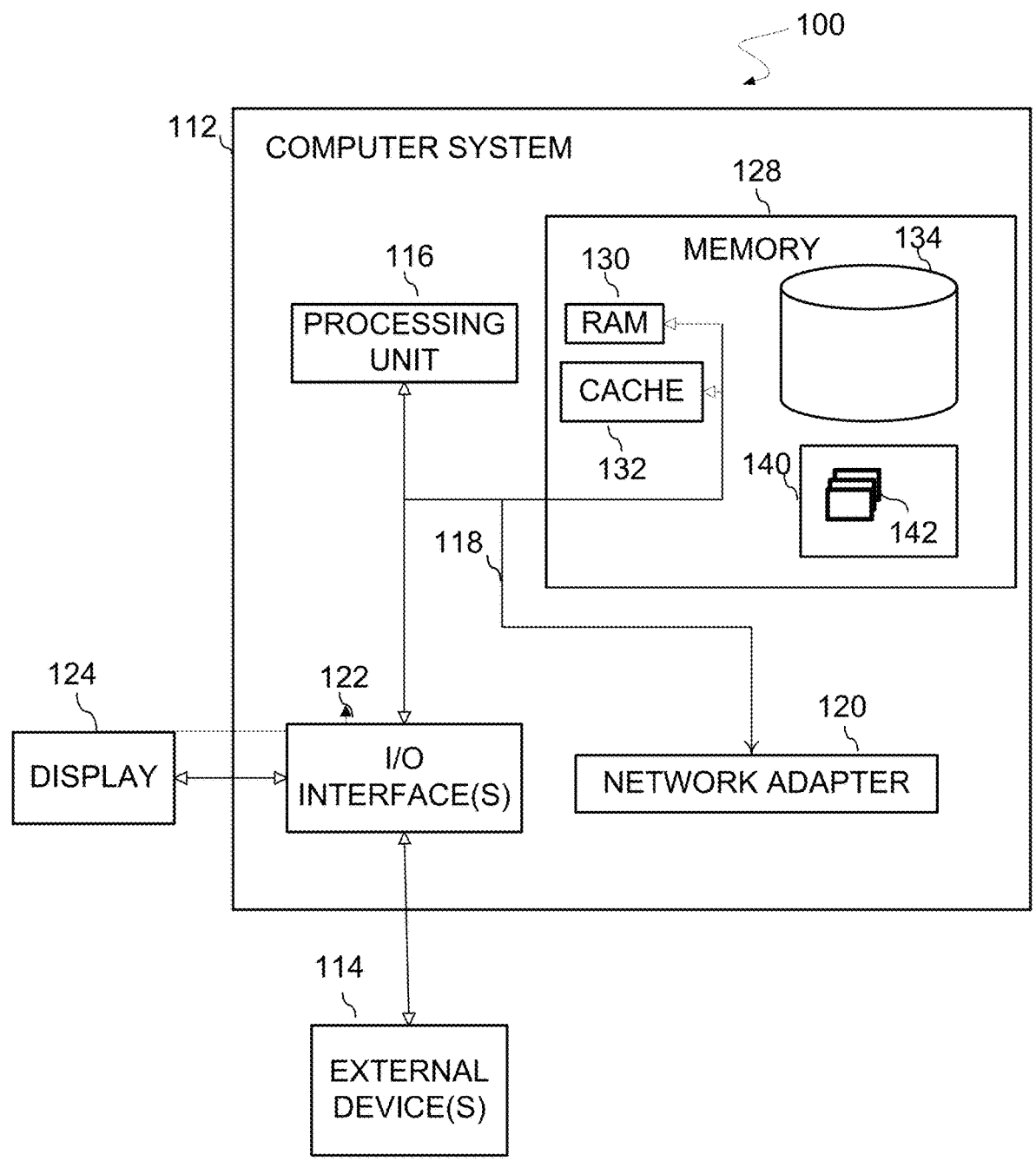
FIG. 1 depicts a computer system 100 according to an embodiment of the present invention and is a block diagram example of a data processing system in which the methods described herein can be implemented.

Referring to FIG. 1, a schematic of a processing system 100 is shown wherein the methods of this invention may be implemented. The processing system 100 is only one example of a suitable system and is not intended to suggest any limitation as to the scope of use or functionality of embodiments of the invention described herein. Regardless, the system 100 is capable of implementing and/or performing any of the functionality set forth herein. In the system 100 there is a computer system 112, which is operational with numerous other general purpose or special purpose computing system environments or configurations. Examples of well-known computing systems, environments, and/or configurations that may be suitable for use with the computer system 112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 112 may be described in the general context of computer system-executable instructions, such as program modules, being executed by a computer system. Generally, program modules may include routines, programs, objects, components, logic, data structures, and so on that perform particular tasks or implement particular abstract data types. The computer system 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 112 in the system environment 100 is shown in the form of a general-purpose computing device. The components of the computer system 112 may include, but are not limited to, a set of one or more processors or processing units 116, a system memory 128, and a bus 118 that couples various system components including the system memory 128 to the processor 116.

The bus 118 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA) bus, the Micro Channel Architecture (MCA) bus, the Enhanced ISA (EISA) bus, the Video Electronics Standards Association (VESA) local bus, and the Peripheral Component Interconnects (PCI) bus.

The computer system 112 typically includes a variety of computer system readable media. Such media may be any available media that is accessible by the computer system 112, and it includes both volatile and non-volatile media, removable and non-removable media.

The system memory 128 can include computer system readable media in the form of volatile memory, such as random access memory (RAM) 130 and/or a cache memory 132. The computer system 112 may further include other removable/non-removable, volatile/non-volatile computer system storage media. By way of example only, a storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 118 by one or more data media interfaces. As will be further depicted and described below, the system memory 128 may include at least one program product having a set (e.g., at least one) of program modules 142 that are configured to carry out the functions of embodiments of the invention.

A program/utility 140, having the set (at least one) of program modules 142, may be stored in the system memory 128 by way of example, and not limitation, as well as an operating system, one or more application programs, other program modules, and program data. Each of the operating systems may have one or more application programs, other program modules, and program data or some combination thereof, and may include an implementation of a networking environment. The program modules 142 generally carry out the functions and/or methodologies of embodiments of the invention as described herein.

The computer system 112 may also communicate with a set of one or more external devices 114 such as a keyboard, a pointing device, a display 124, a tablet, a digital pen, etc. wherein these one or more devices enable a user to interact with the computer system 112; and/or any devices (e.g., network card, modem, etc.) that enable the computer system 112 to communicate with one or more other computing devices. Such communication can occur via Input/Output (I/O) interfaces 122. These include wireless devices and other devices that may be connected to the computer system 112, such as, a USB port, which may be used by a tablet device (not shown). Still yet, the computer system 112 can communicate with one or more networks such as a local area network (LAN), a general wide area network (WAN), and/or a public network (e.g., the Internet) via a network adapter 120. As depicted, network adapter 120 communicates with the other components of the computer system 112 via the bus 118. It should be understood that although not shown, other hardware and/or software components could be used in conjunction with the computer system 112. Examples include, but are not limited to: microcode, device drivers, redundant processing units, external disk drive arrays, RAID systems, tape drives, and data archival storage systems, etc.

Figure 2:
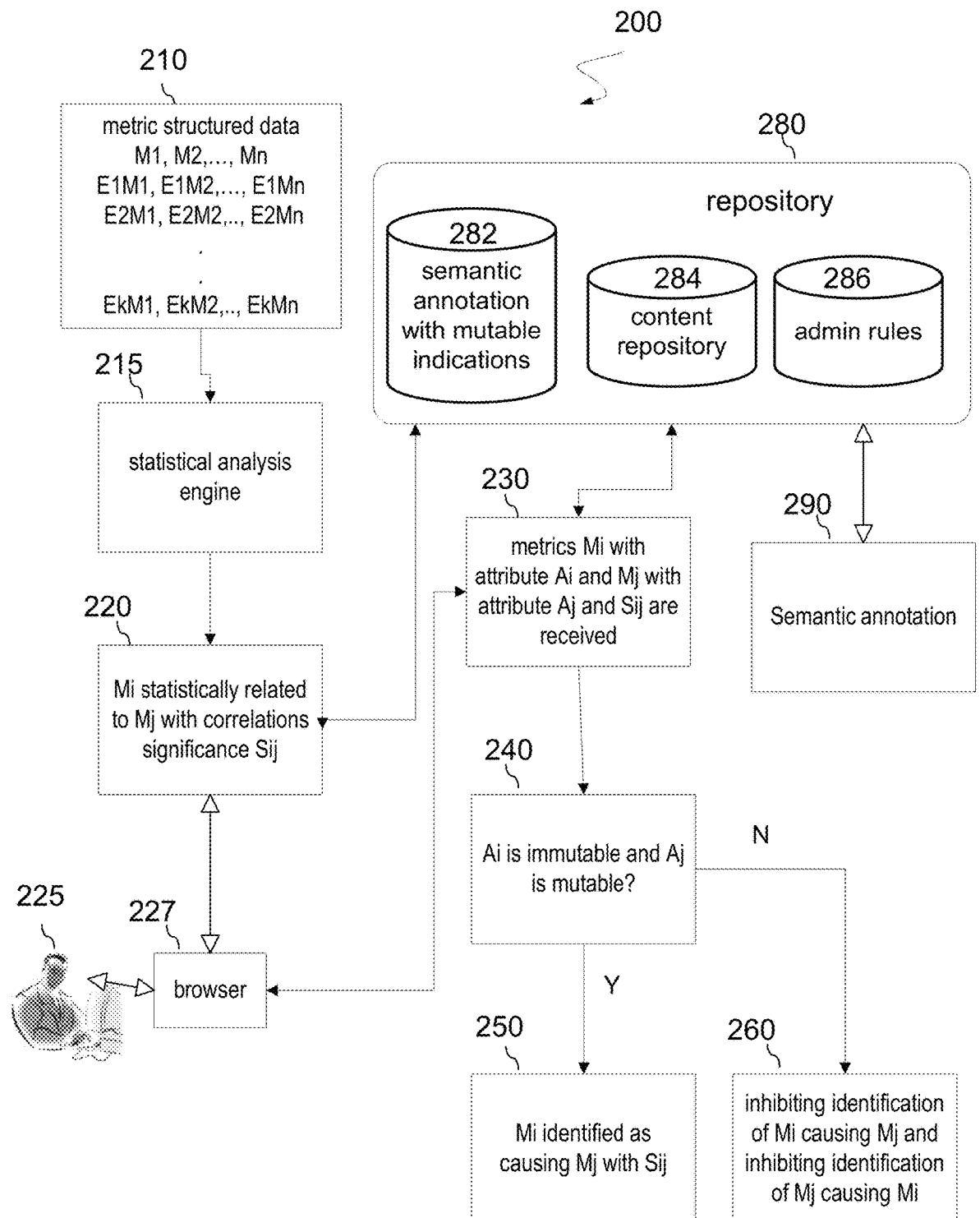
FIG. 2 depicts a functional set of components and a flow of control for identifying causal relationships between measured data.

FIG. 2 depicts a functional set of components and a flow of control for achieving an embodiment of aspects of the invention, more specifically, for identifying a causal relationship between two statistically related variables. An aspect of the invention is described in an example scenario. In this example scenario, the process begins with metric structured data 210 being input to the process. The structured data have descriptive fields each field identifying metrics M1, M2, . . . , Mn. The descriptive fields might be, for example, labels, a label for each column. The description fields might be separated from the data. For illustration purposes only, each entry is referenced as a row in a table, where the E1M1 is the first entry in row 1 for M1, E1M2 is the $2^{nd}$ entry in row 1 for M2, . . . , continuing to E1Mn being the nth entry in row 1 for the metric Mn. Similarly, E2M1 is the first entry in the row 2 for M1, E2M2 is the $2^{nd}$ entry in row 2 for M2, . . . , and E2Mn is the nth entry in row 2 for Mn. This continues for all the input data, where EkM1 is the first entry in row k for M1, EkM2, is the second entry in row k for M2, . . . continuing to EkMn is the nth entry in row k for Mn. Each row may be a record in a database or simply time ordered data. The data may be measurement from any source. Examples sources could include, but are not limited to a web site activity analysis, a business process method, a product manufacturing, a counter from a hardware performance monitor, a sensor from IoT, and the like. The product could be any product, for example, but not limited to, a leaf blower, a vacuum, an image editor, and etc. The process proceeds to step 215 where a statistical analysis engine 215 runs a statistical significance analysis between each metric Mi and Mj by running a mathematical analysis between each entry EkMi to EkMj at each row k in the structured data and calculates a significance Sij between metrics Mi and Mj. The process proceeds to step 220 where statistically related metrics are identified in a repository 280.

The repository 280 may be a database management system (DBMS) supporting indexing, queries, and other typical database features. It could be any data store for recording and retrieving data. It could even be a local cache used for capturing the determined statistically related metrics 220. The repository 280 may include various elements, for example, but not limited to, content repository 284 that identifies, for example, product features and associates the product features with web pages, user browser activity when reaching web pages, metrics, statistical significance between metrics, and the like. The repository 280 may contain admin rules 286 that may determine policies for capturing information, such as tracking of keywords, associating keywords with metrics, rules for changing Web pages, and the like. The repository 280 may have default rules for tracking of keywords and associating keywords with metrics, and the like. There also may be default rules for tracking metrics and significance relationships between metrics. The repository 280 may be adaptive and may automatically adjust based on feedback via artificial intelligence (AI) technology. Alternatively, control of the entire process may be under control of the user 225 controlling the process through a user interface. Although the user interface depicted in FIG. 2 is browser 227, any user interface may be used. The user interface may provide a GUI where the user inputs parameters as menu entries, command line entries, scripts entries, configuration files, .xml files, or any other means of providing the required information.

The user 225 may control the flow of information in the process or there may be preconfigured rules. In this example, a request from user 225 using the browser 227 causes execution of step 230 where metrics Mi with attribute Ai and Mj with attribute Aj and correlations significance Sij are received. Alternatively, the admin rules 286 may cause the execution of step 230. In either case, the process proceeds to step 240 where a determination if the Ai is mutable and the Aj is not mutable. If those conditions are true, the process proceeds to step 250 where Mi is identified as causing Mj with the Sij. Otherwise both conditions are not true and the process proceeds to step 260 where Mi is not identified as causing Mj.

The user 225 may control the flow of information in the process or there may be preconfigured rules. In this example, a request from user 225 using the browser 227 causes execution of step 290 which adds semantic annotation with mutable indication 282 to the repository 280. The semantic annotation may be use natural language processing and artificial intelligence technology such as those found in question answering systems to categorize information. Deep semantic analysis and domain subject matter experts may assist with the semantic annotation.

FIG. 3 depicts an example embodiment depicting example data for an aspect of the invention described herein. Table 310 is an example of metric structured data 210 with descriptive fields. The data is metrics about a manufacturing process. The information about the manufacturing process is included in the repository 280. The repository may be updated by a domain expert that defines concepts and a system that is able to linguistically associate these concepts to fields in the dataset. The information for these concepts are represented by variables cYear, cProductModel, cQuality, cProductQuality, and cRawMaterialQuality in entry 320 of FIG. 3. Although, cProductQuality and cRawMaterialQuality are grouped under a parent cQuality, the grouping is not important for aspects of the invention descried herein, but is typical of ontologies. An ontology based annotator may be used in semantic annotation 290 to annotate each column in the dataset with a concept from the ontology. A flag of mutable or immutable is associated with each concept. Any concept that represents something that can be affected by other data in this domain is tagged as mutable. Any concept that is either simply a label for something, or is an input to this domain is tagged as immutable. So the ontology would be tagged as follows: cYear (immutable) since the year is a label of a physical entity, this is not affected by anything. cProductModel (immutable) since the product is a label of a physical entity, this is not affected by anything. cQuality (mutable) since he quality is a variable within the manufacturing domain, and is affected by the manufacturing process. cRawMaterialQuality (immutable) since the quality of raw inputs to the manufacturing process is established before the manufacturing process kicks in, so cannot be affected by it. Note that the domain expert did not have to define the relationships between these things, they only had to recognize what is variable or not within the current domain.

The system then runs statistical correlation algorithms to determine which columns are correlated and to what degree. The simplest approach would be to simply calculate the correlation of each pair of columns in the dataset. The results could be (scores made up), for example, those in entry 340. In this example there is a statistical correlation between the Quality (mutable)–Impurities (immutable)=−0.7; Year (immutable)–Quality (mutable)=0.3; and Model (immutable)–Impurities (immutable)=0.2.

Now that the system has pair-wise correlations, with the extended ontology and the pair-wise correlations, the system can identify certain cause and effect relationships to present to the user along with the correlations. In this example, the correlations with the extra information would be Impurities->quality=−0.7 and Year->quality=0.3.

With this information the system could present a direction of cause and effect to the user along with the correlation for the pairs that contained a mutable and an immutable column. It could also remove the correlations that contain both immutable from view, as there is no action that could be taken. In this example those entries would most likely be noise anyway.

With the information displayed, the user knows that if they can decrease the impurities coming into the system, they can improve the quality of the outputs of their system. They also find out that the year affects the quality as well, although in this example scenario that isn't actionable.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for identifying a causal relationship between metrics, the method implemented by a processor, comprising:
   receiving metric structured data organized in one or more rows, each data entry in the one or more rows comprising respective descriptive fields for identifying a metric $Mi$ and a metric $Mj$;
   performing a statistical significance analysis between the metric $Mi$ and the metric $Mj$ by running a mathematical analysis between each data entry at each row in the metric structured data;
   calculating a correlation significance $Sij$ between the metric $Mi$ and the metric $Mj$;
   identifying metric $Mi$ as statistically related to metric $Mj$ with correlation significance $Sij$;
   capturing in a repository statistically related metrics $Mi$, $Mj$;
   receiving, via a graphical user interface, a user request for adding semantic annotation to the statistically related metrics $Mi$, $Mj$;
   based on the user request and preconfigured rules, adding to the statistically related metrics $Mi$, $Mj$ the semantic annotation including mutable indications, the semantic annotation being added by an ontology-based annotator using natural language processing and artificial intelligence technology for:
      associating the metric $Mi$ with a concept $Ci$ and the metric $Mj$ with a concept $Cj$, the concept $Ci$ and the concept $Cj$ are extracted from a data source in the repository, and
      based on the concept $Ci$ and the concept $Cj$, retrieving, from the data source, a mutability attribute $Ai$ for the metric $Mi$ and a mutability attribute $Aj$ for the metric $Mj$, respectively, the data source containing domain specific information associated with the mutability attribute $Ai$ and the mutability attribute $Aj$;
   determining, by an artificial intelligence annotation system, whether the mutability attribute $Ai$ is immutable and whether the mutability attribute $Aj$ is mutable to form a causal assessment of true or false of a causal relationship; and
   performing an action based on the causal assessment.

2. The method of claim 1, wherein the causal assessment is true and the action is identifying the causal relationship wherein the casual relationship indicates the significant $Sij$ of the metric $Mj$ caused by the metric $Mi$.

3. The method of claim 2, wherein the causal assessment is false and the action is not identifying the causal relationship.

4. The method of claim 1, wherein each row comprises at least one of a record in a database and time ordered data, data sources for obtaining the metric structured data comprises at least one of a website activity analysis, a business process method, a product manufacturing, a counter from a hardware performance monitor, and a sensor from IoT.

5. The method of claim 1, wherein the repository further comprises:
a content repository to identify product features and associate the product features with at least one of web pages, user browser activity when reaching web pages, metrics, and statistical significance between metrics;
administrative rules to determine policies for capturing information, including at least one of tracking of keywords, associating keywords with metrics, and rules for changing Web pages; and
default rules for tracking of keywords and associating keywords with metrics, and tracking metrics and significance relationships between metrics, wherein the repository is adaptive and automatically adjusted based on feedback via artificial intelligence technology.

6. The method of claim 1, wherein the graphical user interface allows the user inputting parameters as at least one of a menu entry, a command line entry, a script entry, a configuration file, and an .xml files.

7. The method of claim 1, wherein the artificial intelligence annotation system utilizes deep analytic analysis to annotate the domain specific information and the attribute Ai is received by the artificial intelligence annotation system based on input from a domain subject matter expert.

8. A computer program product identifying a causal relationship between metrics, the computer program product comprising a computer readable storage medium having program instructions embodied therewith, the program instructions executable on a processing circuit to cause the processing circuit to perform the method comprising:
receiving metric structured data organized in one or more rows, each data entry in the in one or more rows comprising respective descriptive fields for identifying a metric Mi and a metric Mj;
performing a statistical significance analysis between the metric Mi and the metric Mj by running a mathematical analysis between each data entry at each row in the metric structured data;
calculating a correlation significance Sij between the metric Mi and the metric Mj;
identifying metric Mi as statistically related to metric Mj with correlation significance Sij;
capturing in a repository statistically related metrics Mi, Mj;
receiving, via a graphical user interface, a user request for adding semantic annotation to the statistically related metrics Mi, Mj;
based on the user request and preconfigured rules, adding to the statistically related metrics Mi, Mj the semantic annotation including mutable indications, the semantic annotation being added by an ontology-based annotator using natural language processing and artificial intelligence technology for:
associating the metric Mi with a concept Ci and the metric Mj with a concept Cj, the concept Ci and the concept Cj are extracted from a data source in the repository, and
based on the concept Ci and the concept Cj, retrieving, from the data source, a mutability attribute Ai for the metric Mi and a mutability attribute Aj for the metric Mj, respectively, the data source containing domain specific information associated with the mutability attribute Ai and the mutability attribute Aj;
determining, by an artificial intelligence annotation system, whether the mutability attribute Ai is immutable and whether the mutability attribute Aj is mutable to form a causal assessment of true or false of a causal relationship; and
performing an action based on the causal assessment.

9. The computer program product of claim 8, wherein the causal assessment is true and the action is identifying the causal relationship wherein the casual relationship indicates the significant Sij of the metric Mj caused by the metric Mi.

10. The computer program product of claim 9, wherein the causal assessment is false and the action is not identifying the causal relationship.

11. The computer program product of claim 8, wherein each row comprises at least one of a record in a database and time ordered data, data sources for obtaining the metric structured data comprises at least one of a website activity analysis, a business process method, a product manufacturing, a counter from a hardware performance monitor, and a sensor from IoT.

12. The computer program product of claim 8, wherein the repository further comprises:
a content repository to identify product features and associate the product features with at least one of web pages, user browser activity when reaching web pages, metrics, and statistical significance between metrics;
administrative rules to determine policies for capturing information, including at least one of tracking of keywords, associating keywords with metrics, and rules for changing Web pages; and
default rules for tracking of keywords and associating keywords with metrics, and tracking metrics and significance relationships between metrics, wherein the repository is adaptive and automatically adjusted based on feedback via artificial intelligence technology.

13. The computer program product of claim 8, wherein the graphical user interface allows the user inputting parameters as at least one of a menu entry, a command line entry, a script entry, a configuration file, and an .xml files.

14. The computer program product of claim 8, wherein the attribute Ai is received by the artificial intelligence annotation system based on input from a domain subject matter expert.

15. An information handling system identifying a causal relationship between metrics, the information handling system comprising:
at least one processor;
a memory coupled to the at least one processor;
a set of instructions stored in the memory and executed by the at least one processor wherein the set of instructions perform operations including:
method implemented by a processor, comprising:
receiving metric structured data organized in one or more rows, each data entry in the in one or more rows comprising respective descriptive fields for identifying a metric Mi and a metric Mj;
performing a statistical significance analysis between the metric Mi and the metric Mj by running a mathematical analysis between each data entry at each row in the metric structured data;
calculating a correlation significance Sij between the metric Mi and the metric Mj;
identifying metric Mi as statistically related to metric Mj with correlation significance Sij;
capturing in a repository statistically related metrics Mi, Mj;

receiving, via a graphical user interface, a user request for adding semantic annotation to the statistically related metrics Mi, Mj;

based on the user request and preconfigured rules, adding to the statistically related metrics Mi, Mj the semantic annotation including mutable indications, the semantic annotation being added by an ontology-based annotator using natural language processing and artificial intelligence technology for:

associating the metric Mi with a concept Ci and the metric Mj with a concept Cj, the concept Ci and the concept Cj are extracted from a data source in the repository, and based on the concept Ci and the concept Cj, retrieving, from the data source, a mutability attribute Ai for the metric Mi and a mutability attribute Aj for the metric Mj, respectively, the data source containing domain specific information associated with the mutability attribute Ai and the mutability attribute Aj;

determining, by an artificial intelligence annotation system, whether the mutability attribute Ai is immutable and whether the mutability attribute Aj is mutable to form a causal assessment of true or false of a causal relationship; and performing an action based on the causal assessment.

16. The information handling system of claim 15, wherein the causal assessment is true and the action is identifying the causal relationship wherein the casual relationship indicates the significant Sij of the metric Mj caused by the metric Mi.

17. The information handling system of claim 16, wherein the causal assessment is false and the action is not identifying the causal relationship.

18. The information handling system of claim 15, wherein each row comprises at least one of a record in a database and time ordered data, data sources for obtaining the metric structured data comprises at least one of a website activity analysis, a business process method, a product manufacturing, a counter from a hardware performance monitor, and a sensor from IoT.

19. The information handling system of claim 15, wherein the repository further comprises:

a content repository to identify product features and associate the product features with at least one of web pages, user browser activity when reaching web pages, metrics, and statistical significance between metrics;

administrative rules to determine policies for capturing information, such as including at least one of tracking of keywords, associating keywords with metrics, and rules for changing Web pages; and default rules for tracking of keywords and associating keywords with metrics, and tracking metrics and significance relationships between metrics, wherein the repository is adaptive and automatically adjusted based on feedback via artificial intelligence technology.

20. The information handling system of claim 15, wherein the graphical user interface allows the user inputting parameters as at least one of a menu entry, a command line entry, a script entry, a configuration file, and an .xml files.

* * * * *